March 27, 1956
H. C. KRONE ET AL
2,739,779
SPRING COUNTERBALANCED SWING JOINT
SUPPORTED CONDUIT
Filed Oct. 1, 1954
3 Sheets-Sheet 1
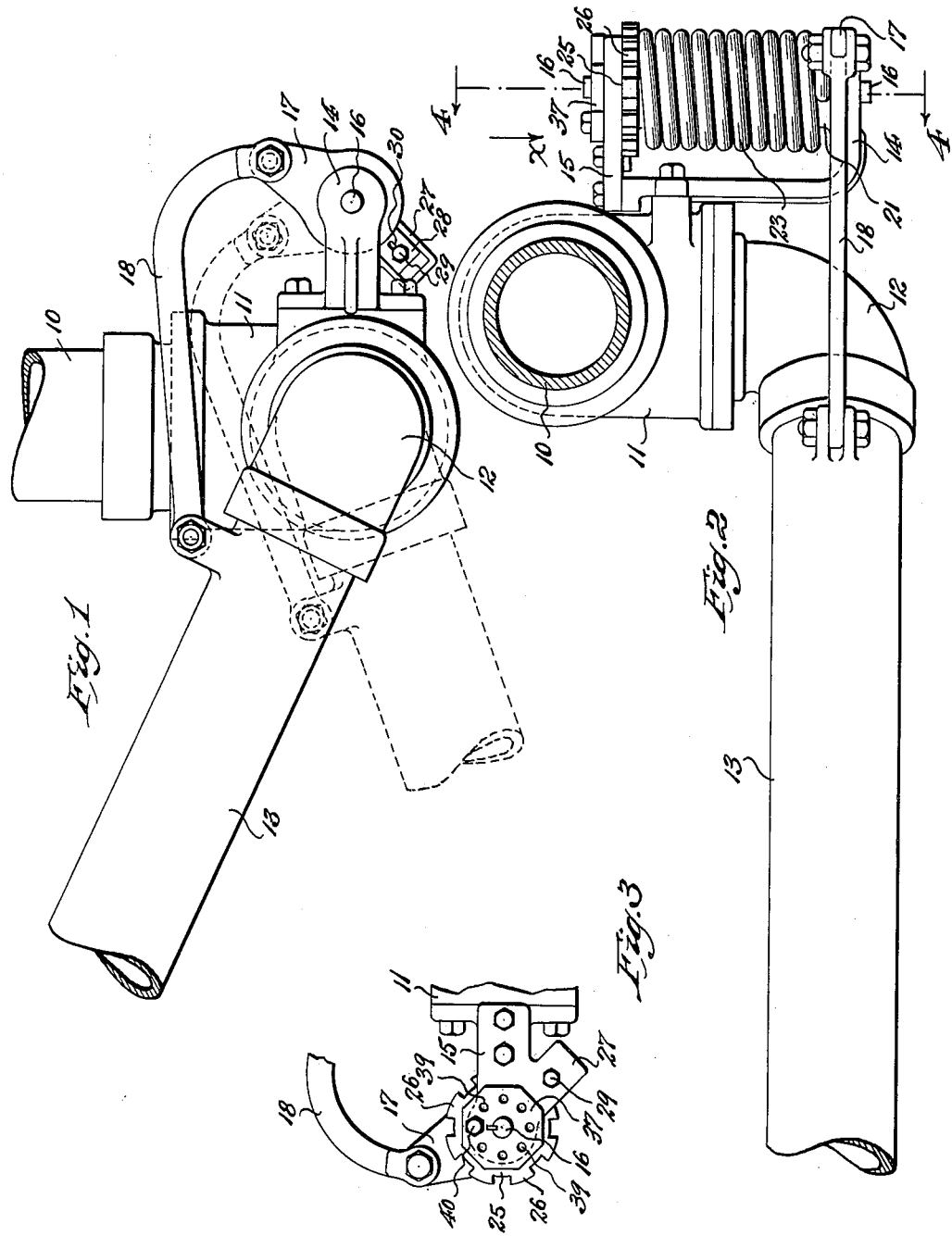
INVENTORS:
Howard C. Krone, William Meyer
BY & Richard Slawinski
George A. Richards
Attorney

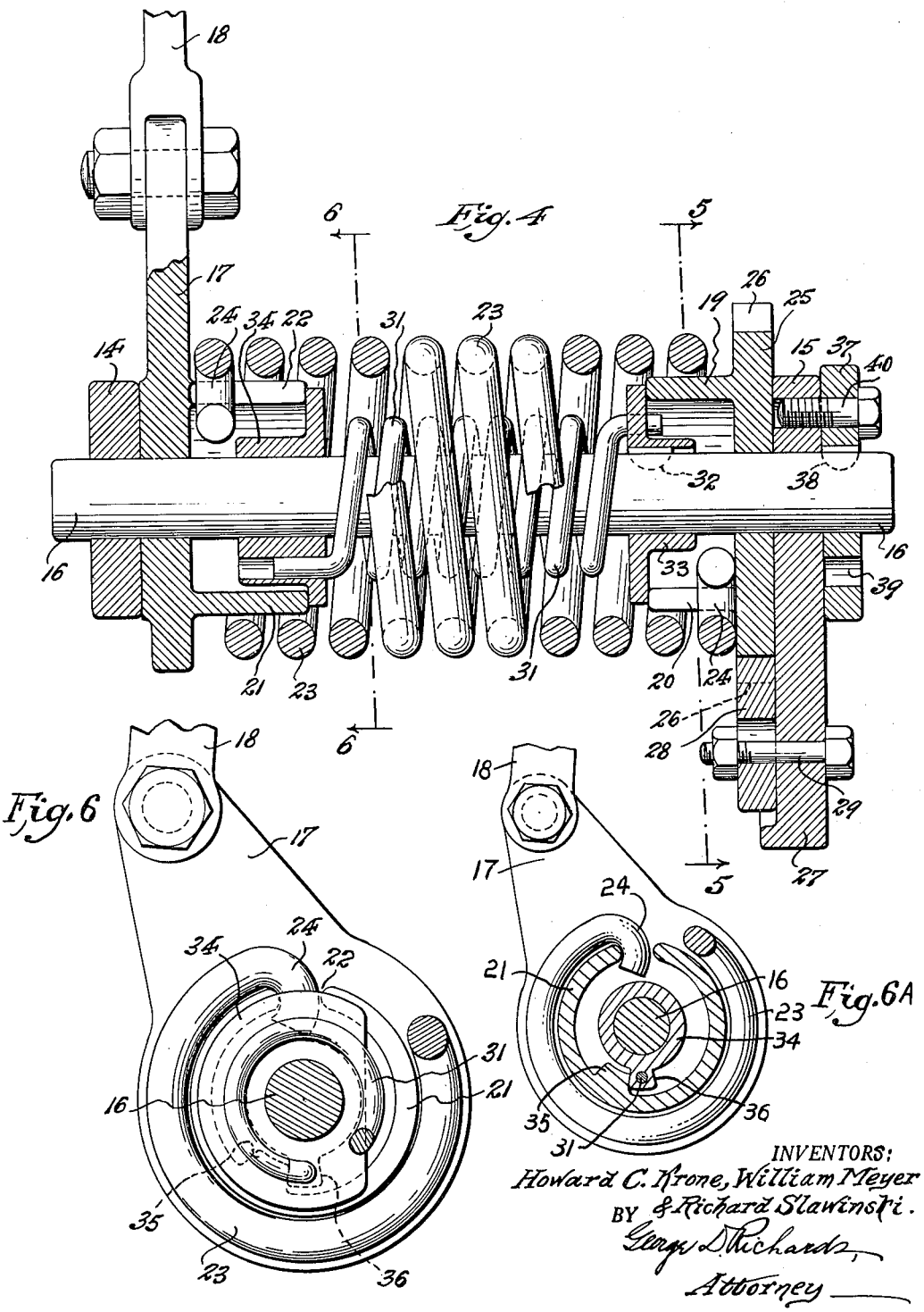

March 27, 1956
H. C. KRONE ET AL
2,739,779
SPRING COUNTERBALANCED SWING JOINT
SUPPORTED CONDUIT
Filed Oct. 1, 1954
3 Sheets-Sheet 3
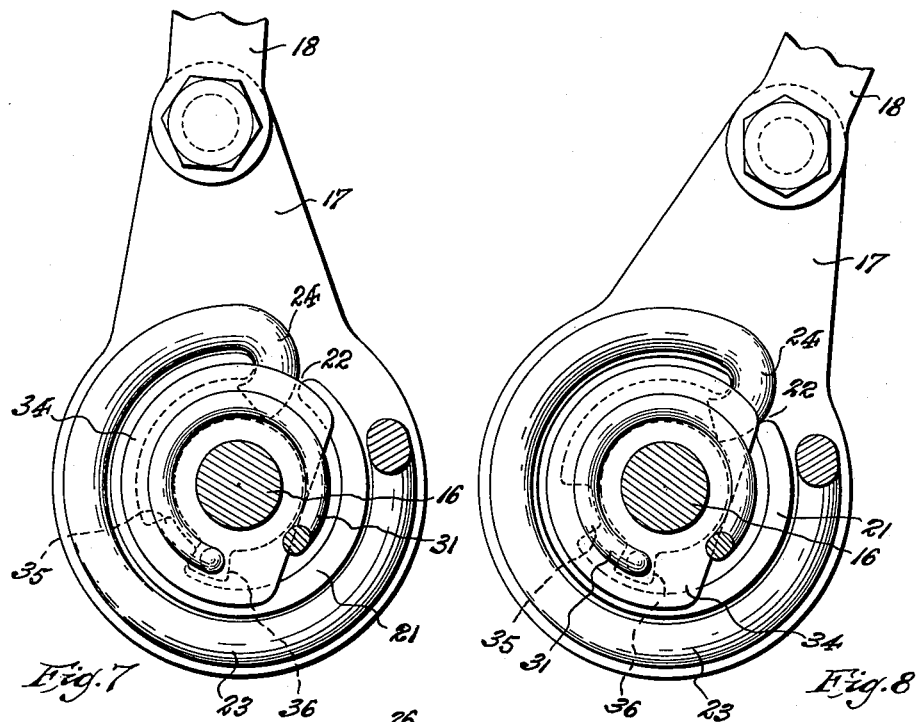
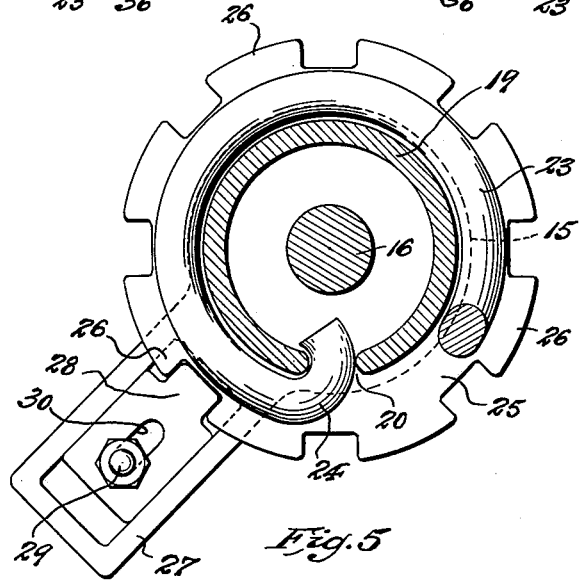
INVENTORS:
Howard C. Krone, William Meyer
BY & Richard Slawinski
George S. Richards
Attorney

United States Patent Office 2,739,779
Patented Mar. 27, 1956

2,739,779

SPRING COUNTERBALANCED SWING JOINT SUPPORTED CONDUIT

Howard C. Krone, Short Hills, William Meyer, East Orange, and Richard Slawinski, Union, N. J., assignors to Wheaton Brass Works, Union, N. J., a corporation of New Jersey Application October 1, 1954, Serial No. 459,691

7 Claims. (Cl. 248—292)

This invention relates to improvements in spring counterbalanced swing joint supported conduit or like arms of the general type disclosed in our co-pending application for Letters Patent Ser. No. 391,078, being especially well adapted for use in loading conduit systems for delivering fluids from supply sources, such as for loading oil, gasolene or other liquids into tank trucks, railroad tank cars, aeroplane storage tanks or other containers in which such liquids are transported or shipped; and the invention has reference, more particularly, to a swing joint supported loading or discharge arm adapted to be swung up and down, from either an overhead supply pipe system or a supply stand pipe, to optionally dispose the same in out of service position or in service position.

The instant invention has for an object to provide, in combination with the swingable discharge arm, a counterbalancing spring means operative to return said discharge arm to and hold the same in its up swung out of service position, and a buffer spring means to arrest up swinging movement of the discharge arm so as to bring the same to its out of service position without shock, including a pivoted lever member linked to the discharge arm so as to apply tensioning torque to the counterbalancing spring means, when the discharge arm is down swung to service position, and means being further included to provide a lost motion connection between said lever member and the buffer spring means, whereby to neutralize the latter during application of tensioning torque to the counterbalancing spring means, and to delay application of tensioning torque to said buffer spring means until the tension of the counterbalancing spring means has about completed return of the discharge arm from service to out of service position.

The above and other objects will be understood from a reading of the following detailed description of the instant invention in connection with the accompanying drawings, in which:

Fig. 1 is a side elevational view of a swing joint supported loading or discharge arm connected with an overhead supply pipe system, and equipped with the counterbalancing and buffer spring means according to the instant invention, said discharge arm being shown by full lines in its up swung out of service position, and by broken lines in its down swung service position; Fig. 2 is a top plane view of the same; and Fig. 3 is a fragmentary end elevation, viewed in the direction of the arrow X in Fig. 2.

Fig. 4 is a fragmentary longitudinal sectional view, taken on line 4—4 in Fig. 2, but drawn on an enlarged scale; Fig. 5 is a detail vertical cross-sectional view, taken on line 5—5 in Fig. 4; Fig. 6 is a detail vertical cross sectional view taken on line 6—6 in Fig. 4; Fig. 6A is a detail vertical cross sectional view taken on line 6A—6A in Fig. 4; Figs. 7 and 8 are respectively views similar to that of Fig. 6, but showing different positions of the lost motion connection between the actuating lever member and the buffer spring means.

Similar characters of reference are employed in the above described views, to indicate corresponding parts.

Referring to the drawings, the reference character 10 indicates an overhead supply pipe of a loading conduit system which leads from a source of liquid or other fluid to be discharged. Connected to and in communication with the supply pipe 10 is a swing joint comprising a relatively stationary joint section 11, which may be connected to the supply pipe so as to turn about a vertical axis, and a swing joint section 12 connected with said stationary joint section 11 and adapted to turn about a horizontal axis. To said swing joint section 12 is connected the discharge arm 13, whereby the same can be swung up to an out of service position and down to a service position. To the free end of the discharge arm 13 there is usually pivotally connected a drop pipe (not shown), and either the discharge arm or said drop pipe may be equipped with any suitable form of manipulatable control or faucet valve (not shown), by which flow of liquid or other fluid from the discharge arm can be controlled, all as well known to the art.

Suitably affixed to the stationary joint section 11 are laterally spaced apart and rearwardly projecting bracket arms 14 and 15. Supported by said bracket arms, so as to extend between free end portions thereof, is a transverse shaft 16, which is thus disposed parallel to the horizontal axis of the swing joint 12. Pivotally supported by said shaft 16 is an upstanding lever member 17. Pivotally connected to the free end of said lever member is the rearward end portion of a link bar 18, the forward end of which is pivotally connected with the swingable discharge arm 13, so that corresponding motion of the latter is transmitted by said link bar 18 to the lever member 17. In the single counterbalancing spring structure, which is shown by way of illustration, said lever member 17 is disposed adjacent to the bracket arm 14.

Also supported by the pivoting shaft 16, adjacent the bracket arm 15, is an inwardly projecting hollow anchoring hub member 19, the wall of which is provided with an indenting longitudinal slot or opening 20. The lever member 17 is likewise provided with an inwardly projecting hollow coupling hub member 21, the wall of which is also provided with an indenting longitudinal slot or opening 22.

Extending between the anchoring hub member 19 and the coupling hub member 21 of the lever member 17 is a relatively heavy, spirally convolute counterbalancing spring 23, into the respective end portions of which said respective hub members extend. Said counterbalancing spring 23 terminates at its respective ends in coupling hook elements 24 which are respectively engaged through the slots or openings 20 and 22 of said hub members 19 and 21, whereby to couple said spring ends to said respective hub members. Said counterbalancing spring is formed with left hand helical turns, so that when the lever member 17 and its coupling hub member 21 is rotated counterclockwise, by down swinging movement of the discharge arm 13 to service position, said counterbalancing spring 23 will be wound to a condition of strong torsional tension which reacts in clockwise direction to return the discharge arm to up swung out of service position.

The anchoring hub member 19 can be rotatably adjusted about the shaft 16, whereby to predetermine a desired normal or relaxed tension of the counterbalancing spring 23, means being provided to releasably retain said anchoring hub member in a position to which it has been adjusted. To permit such adjustment and holding of the anchoring hub member 19, the same is provided with

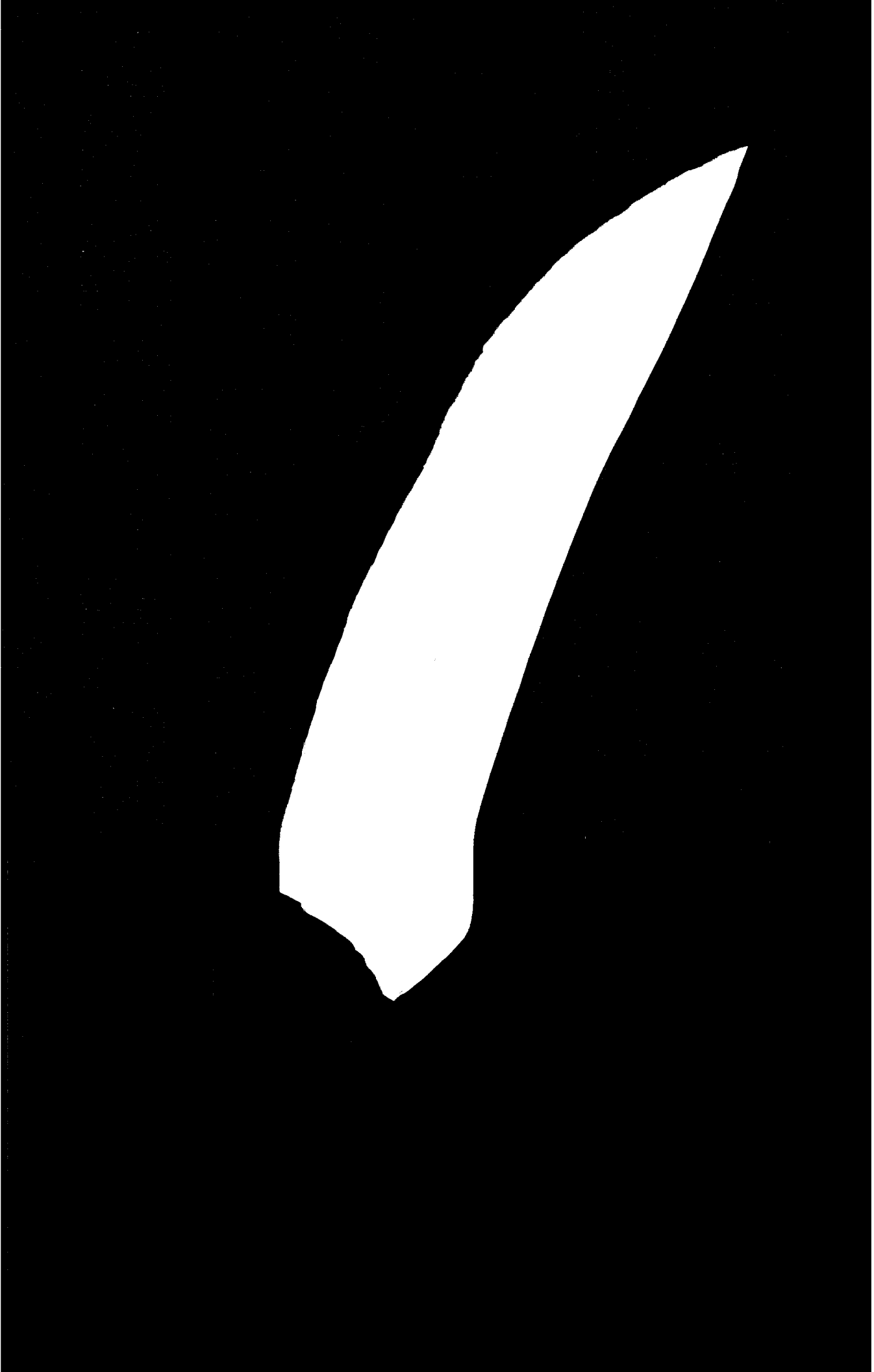

the pivot shaft, and a lost motion connection to couple the opposite end of said buffer spring to the lever member, said buffer spring being adapted to be wound to a condition of torsional tension during the final stage of reverse rotation of the lever member induced by tensional torque of the counterbalancing spring, thereby to counter and overcome tensional torque of the latter so as to cushion against shock the return of the swing joint supported arm to its normal up swung position.

2. In combination with a swing joint supported arm wherein the supporting swing joint includes a relatively stationary section, means to counterbalance said arm for normal disposition in up swung position comprising a pivot shaft supported by the relatively stationary section of the swing joint in rearwardly offset parallel relation to the pivotal axis of said joint, a lever member pivotally mounted on said shaft, a link bar interconnecting said lever member with the swing joint supported arm, a counterbalancing helical spring anchored by one end in connection with said stationary section of the swing joint to extend about said pivot shaft and coupled by an opposite end to said lever member, a helical buffer spring also anchored by one end in connection with said stationary section of the swing joint to extend about the pivot shaft toward the lever member, a coupling collar rotatable about the pivot shaft to which an opposite end of the buffer spring is connected, and means to provide a lost motion connection between said coupling collar and said lever member.

3. In combination with a swing joint supported arm wherein the supporting swing joint includes a relatively stationary section, means to counterbalance said arm for normal disposition in up swung position comprising a normally non-rotative pivot shaft supported by the relatively stationary section of the swing joint in rearwardly offset parallel relation to the pivotal axis of said joint, a lever member pivotally mounted on said shaft, said lever member having a hollow coupling hub, a link bar interconnecting said lever member with the swing joint supported arm, a counterbalancing helical spring anchored by one end in connection with said stationary section of the swing joint to extend about said pivot shaft and coupled by an opposite end to the coupling hub of the lever member, a helical buffer spring anchored by one end to said pivoting shaft to extend about said shaft toward the lever member, a coupling collar rotatable about the pivot shaft to which an opposite end of the buffer spring means is connected, said coupling collar being entered in the coupling hub of the lever member, and means to provide a lost motion connection between said lever member and coupling collar comprising an internal clutch tongue with which the coupling hub of the lever member is provided, and an external clutch tongue with which the coupling collar is provided operative to engage said internal clutch tongue.

4. In combination with a swing joint supported arm wherein the supporting swing joint includes a relatively stationary section, means to counterbalance said arm for normal disposition in up swung position comprising laterally spaced bracket arms rearwardly extending from said stationary section of the swing joint, a normally non-rotatable pivot shaft supported by and between said bracket arms in offset parallel relation to the pivotal axis of the swing joint, a lever member pivotally mounted on said shaft, said lever member having a hollow coupling hub, a link bar interconnecting said lever member with the swing joint supported arm, a counterbalancing helical spring extending about said pivot shaft, a normally fixed anchoring hub member around said shaft to which an end of said counterbalancing spring is anchored, the opposite end of said counterbalancing spring being coupled to the coupling hub of the lever member, a helical buffer spring also extending about said pivot shaft, an anchoring collar fixed on said shaft by which one end of said buffer spring is anchored, a coupling collar rotatable about said shaft to which the opposite end of the buffer spring is connected, said coupling collar being entered in the coupling hub of the lever member, and means to provide a lost motion connection between said lever member and coupling collar comprising an internal clutch tongue with which the coupling hub of the lever member is provided, and an external clutch tongue with which the coupling collar is provided operative to engage said internal clutch tongue.

5. The combination defined by claim 4 wherein the anchoring hub member is rotatably adjustable to predetermine initial tension of the counterbalancing spring, said anchoring hub member and an adjacent bracket arm being provided with cooperative means to releasably hold the former in selected adjusted position.

6. The combination defined by claim 4 wherein the pivot shaft with the anchoring collar is rotatably adjustable to predetermine initial tension of the buffer spring, means being provided for releasably holding said shaft and anchoring collar in selected adjusted position.

7. The combination defined by claim 4 wherein the anchoring hub member is rotatably adjustable to predetermine initial tension of the counterbalancing spring, said anchoring hub member and an adjacent bracket arm being provided with cooperative means to releasably hold the former in selected adjusted position, and wherein the pivot shaft with the anchoring collar is rotatably adjustable to predetermine initial tension of the buffer spring, means being provided for releasably holding said shaft and anchoring collar in selected adjusted position.

References Cited in the file of this patent

UNITED STATES PATENTS

| 884,105 | Ryerson et al. | Apr. 7, 1908 |
| 2,200,518 | Perbal | May 14, 1940 |
| 2,299,251 | Perbal | Oct. 20, 1942 |

FOREIGN PATENTS

| 772,052 | France | of 1934 |